United States Patent [19]
Amrein et al.

[11] Patent Number: 5,762,666
[45] Date of Patent: Jun. 9, 1998

[54] FEEDER-AIR LOCK WITH SLIDE GATES

[76] Inventors: David L. Amrein, 1316 Joni Dr., Louisville, Ky. 40216; Ronda M. White, 203 Village Pine Dr., New Albany, Ind. 47150; Donald Pulford, Sr., 9508 Hudson La., Louisville, Ky. 40291

[21] Appl. No.: 634,201

[22] Filed: Apr. 18, 1996

[51] Int. Cl.$^6$ ................................. B01D 45/018
[52] U.S. Cl. ...................... 55/425; 55/432; 55/459.1
[58] Field of Search ..................... 55/432, 424, 425, 55/459.1

[56] References Cited

U.S. PATENT DOCUMENTS

| | | | |
|---|---|---|---|
| 4,300,921 | 11/1981 | Littrell | 55/96 |
| 4,938,250 | 7/1990 | Peterson | 137/244 |
| 4,963,172 | 10/1990 | DeMarco | 55/429 |
| 5,178,180 | 1/1993 | Parris et al. | 137/242 |

OTHER PUBLICATIONS

Powder and Bulk Engineering, Jun. 1992 pp. 32-33, Case History.
Premier Pneumatics, Inc., Aerolock, Jul. 1991.
Plant Engineering—Troubleshooting Cyclone Dust Collectors, Jun. 3, 1993 by David L. Amrein.
Chemical Engineering—Tips for Selecting Highly Efficient Cyclones, May 1995, by David L. Amrein.

*Primary Examiner*—Jay H. Woo
*Assistant Examiner*—Robert Hopkins
*Attorney, Agent, or Firm*—Wheat, Camoriano, Smith & Beres, PLC

[57] ABSTRACT

A feeder-air lock provides a pair of slide gates, with the support for the slide gates and the mechanism for driving the slide gates located outside of the material passage, so as to provide a smooth, downwardly-sloping wall for directing the material downwardly without trapping or jamming material and so that the feeder-air lock provides a reliable mechanism which requires little maintenance.

10 Claims, 4 Drawing Sheets

FEEDER-AIR LOCK WITH SLIDE GATES

BACKGROUND OF THE INVENTION

The present invention relates to air locks and feeders, and, in particular, to a feeder-air lock including slide gates.

There are many different situations in which feeder-air locks are used. One situation in which they are needed is at the bottom of a dust-separating cyclone to prevent air from being pulled up through the bottom of the cyclone while permitting the dust to fall out the bottom of the cyclone. In this situation, if there is air leakage through the feeder-air lock, the efficiency of the cyclone is reduced. Other problems include jamming and plugging of the feeder, which requires it to be shut down for cleaning. If the type of dust being separated out is highly flammable, such as aluminum powder, then there can be additional problems if dust is caught or jammed in the feeder, such as explosions.

Various types of feeder-air locks are known. One type is a rotary feeder, which is similar to a revolving door turned on its side. With this type of feeder-air lock, abrasive dust tends to cause the seals to wear out quickly, permitting air leakage, which reduces the effectiveness of the cyclone. Also, if the dust is prone to packing, it can readily pack the spaces between the rotor blades, plugging up the feeder-air lock.

Slide gate feeder-air locks are also known. These feeder-air locks also have problems. The slide gates ride on tracks which are inside the passage through which the dust or other material must pass. When the gates are open, the material catches and builds up on the tracks. This causes the gates to slide improperly or stick, strains the motor that drives the gates, and wears the gates and seals. If the dust is highly flammable, as is aluminum powder, the dust that has collected on the tracks may cause an explosion.

SUMMARY OF THE INVENTION

The present invention provides a solution to the aforementioned problems of prior art feeder-air locks. The present invention provides a feeder-air lock which provides a straight, smooth path for the dust to follow down the passage, without tracks, vanes, or other members to collect dust, plug up, or jam. It also provides a feeder-air lock which has a good seal and which is not prone to wear and leakage.

The present invention provides a feeder-air lock which includes a pair of slide gates which are supported and driven in an area away from the passage through which the dust passes. There are no tracks or other parts inside the passage through which the dust passes on which the dust can accumulate or jam. The passage remains clean and smooth, so that the dust readily passes through.

DESCRIPTION OF THE PREFERRED EMBODIMENT

Figure 1:
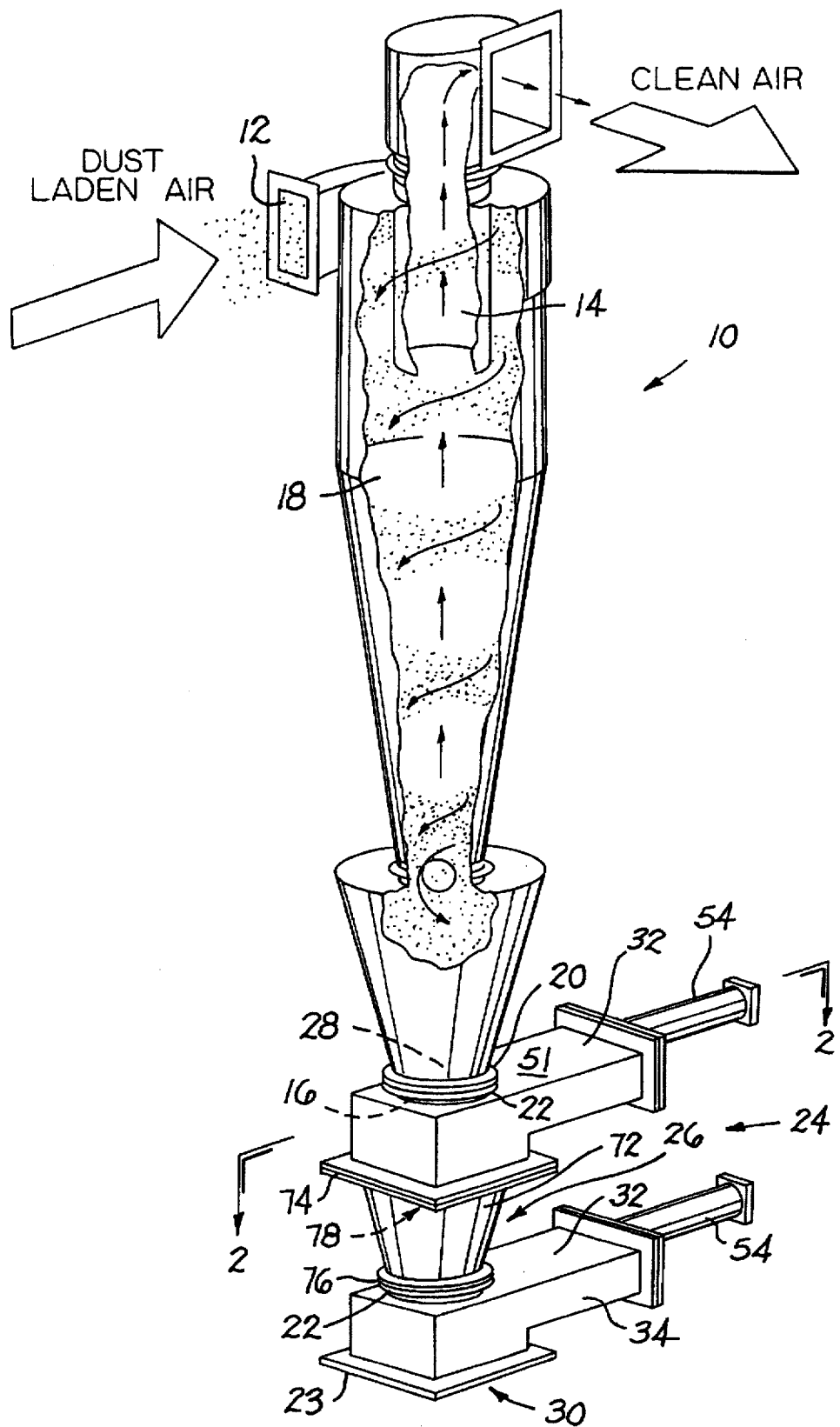
FIG. 1 is a schematic, partially broken-away, perspective view of a cyclone connected to a feeder-air lock made in accordance with the present invention.

FIG. 1 shows a cyclone 10, with an inlet 12 for receiving dust laden air, a clean air outlet 14, and, at the bottom, a dust outlet 16. When dust laden air enters the cyclone inlet 12, it impinges by cyclonic force on the inside of the wall 18 of the cyclone 10, following a downward spiral path, as shown by the arrows. Most of the dust is separated from the air stream and slides to the bottom of the cyclone, and the clean air then reverse flow vortexes up through the center of the cyclone 10 and exits through the clean air outlet 14. If the cyclone 10 were simply open to the atmosphere at the dust outlet 16, then air would be drawn up through the dust outlet 16, re-entraining the dust that had been separated out of the air in the cyclone, and greatly reducing the efficiency of the cyclone.

A flange 20 at the bottom of the cyclone 10 surrounds the dust outlet 16 and is bolted to a flange 22 at the top of a feeder-air lock 24. The feeder-air lock 24 includes a substantially vertical passage 26 through which the dust or other material passes from the material inlet 28 to the material outlet 30. Mounted on the passage 26 are two slide gate housings 32, 34, which house slide gates (shown in other figures), which open and close the passage 26. The slide gates are operated in an alternating manner, so that, when one gate is opened the other is closed, and one gate is closed at all times, to prevent air from entering through the material outlet 30 and passing up into the bottom 16 of the cyclone 10. When the top gate is closed, material accumulates on top of it, and, when the top gate is open, material falls down, off of the top gate onto the bottom gate. Then, the top gate is closed again and the bottom gate is opened, allowing the material to pass out, through the material outlet 30.

Figure 2:
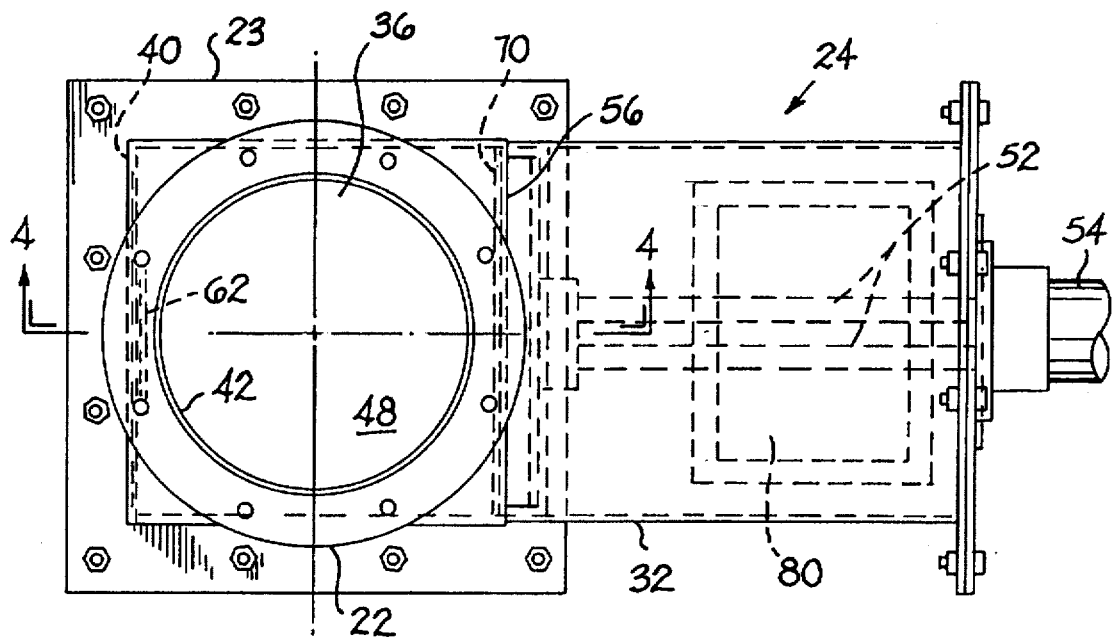
FIG. 2 is a view taken along the section 2—2 of FIG. 1.

FIGS. 2–7 show the details of the feeder-air lock 24. In FIG. 2, looking down on the top slide gate 36, which is closed, it can be seen that the free end 40 of the top slide gate 36 is squared off, conforming to the shape of the housing 32, so that, when the slide gate 36 is in its extended, closed position, as shown, it butts up against the inside wall 42 of the housing 32.

Figure 3:
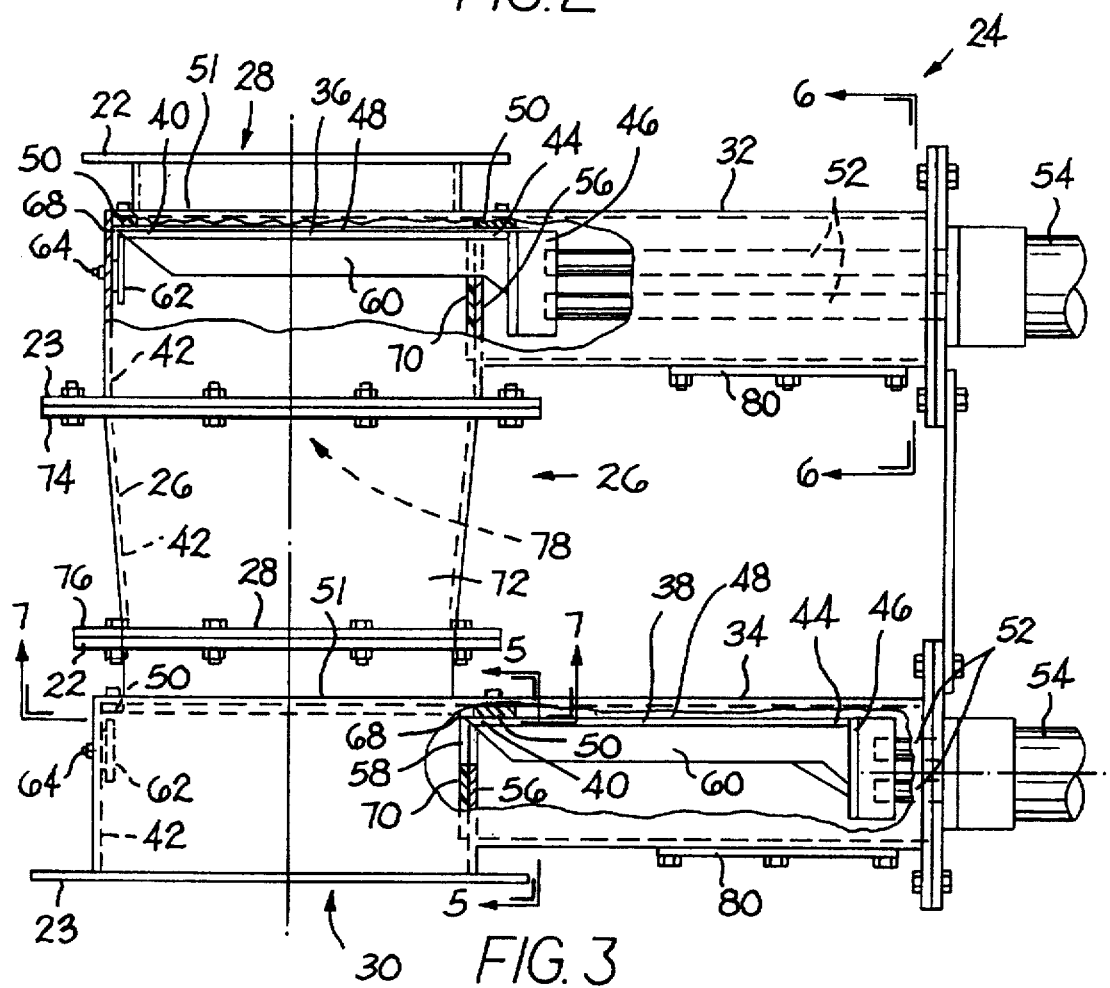
FIG. 3 is a front view, partially broken-away, of the feeder-air Lock of FIG. 1.

Looking now at FIG. 3, it can be seen that the top surface 48 of the top slide gate 36 is flat and smooth and is pressed against the smooth, flat sealing-scraper surface 50 mounted on the inside top surface of the top wall 51 of the housing 32. The sealing-scraper surface 50 surrounds the material inlet 28, and is preferably made of Teflon™ or some other low friction material which is lower friction than the inside wall 42 of the housing 32 so as to provide low friction as the slide gate moves in and out. Since the sealing surface 50 extends completely around the material inlet 28, when the slide gate 36 is in its extended, closed position, as shown, and is sealed against the sealing surface 50, it prevents material from passing beyond the top slide gate 36. It should be noted that the bottom slide gate housing 34 identical to the top slide gate housing 32 and functions in the same way.

The slide gate 36 (or 38) preferably is driven by a piston-cylinder arrangement located outside of the passageway 26, as shown, or by some other type of drive located outside of the passage 26. In the preferred embodiment, the drive end 44 of the slide gate 36 (or 38) is fixed to a vertical plate 46, which is fixed to three parallel piston rods 52, which project out of the cylinder 54. The cylinder 54 is fixed relative to the housing 32. This special design, with three piston rods instead of the usual one piston rod, is preferred in order to give stability to the slide gate 36 (or 38), particularly when the slide gate is cantilevered out into the passage 26.

When fluid pressure is applied to the right side of one of the cylinders 54, it causes the respective piston rods 52 to move to the left, extending and closing the slide gate 36 (or 38), and, when fluid pressure is applied to the left side of that cylinder 54, it causes the respective piston rods 52 to move to the right, retracting and opening the slide gate 36 (or 38). FIG. 3 shows the lower slide gate 38 in the retracted, open position.

The housing 32 (or 34) includes a substantially vertical separator wall 56, which has an upwardly-opening slot 58, which receives and supports the support rib 60, projecting down from the bottom surface of the slide gate 36 (or 38). The rib 60 helps support the weight of the slide gate 36 (or 38) as the slide gate 36 (or 38) is cantilevered out into the passage 26. In this preferred embodiment of the invention, the rib 60 in the slot 58 and the piston rods 52 provide the only support for the slide gate 36 (or 38) as it extends and retracts. When the slide gate 36 (or 38) is fully extended, there is one additional support for the free end 40 of the gate 36 (or 38), as shown best in FIG. 4.

A short ledge 62 is bolted to the inside surface 42 of the passage 26 opposite the separator wall 56 by means of bolts 64, and spacers 66 hold the ledge 62 away from the inside surface 42 of the passage 26, so that there is a space between the ledge 62 and the passage wall 42. The top surface of the ledge 62 is located at a height such that, when the gate 36 (or 38) is closed, the ledge 62 guides the free end 40 of the gate 36 (or 38) up against the sealing-scraper surface 50.

The free end 40 of the gate 36 (or 38) extends beyond the end of the rib 60 and is tapered to a knife edge 68 at its top edge. The taper and knife edge serve several functions. First, even if the free end 40 of the gate 36 (or 38) sags slightly as it is extended toward the ledge 62, the knife edge 68 still lies above the ledge 62, and the tapered leading edge helps lift the gate 316 (or 38) up, so that it rides up onto the ledge 62 as it closes. Second, as the gate 36 (or 38) closes, the free end 40 of the gate 36 (or 38) pushes any dust that has collected on the ledge 62 off of the ledge 62, with the dust falling off of the ends of the ledge or through the space between the ledge 62 and the inside wall 42 of the passage 26, so that no substantial amount of dust can accumulate on the ledge 62. Third, the sharp knife edge (58 provides only a line contact with the inside surface 42 of the passage 26 when the gate 36 (or 38) is closed, so it cannot trap any substantial amount of dust between the gate 36 (or 38) and the wall 42 of the passage 26.

Figure 4:
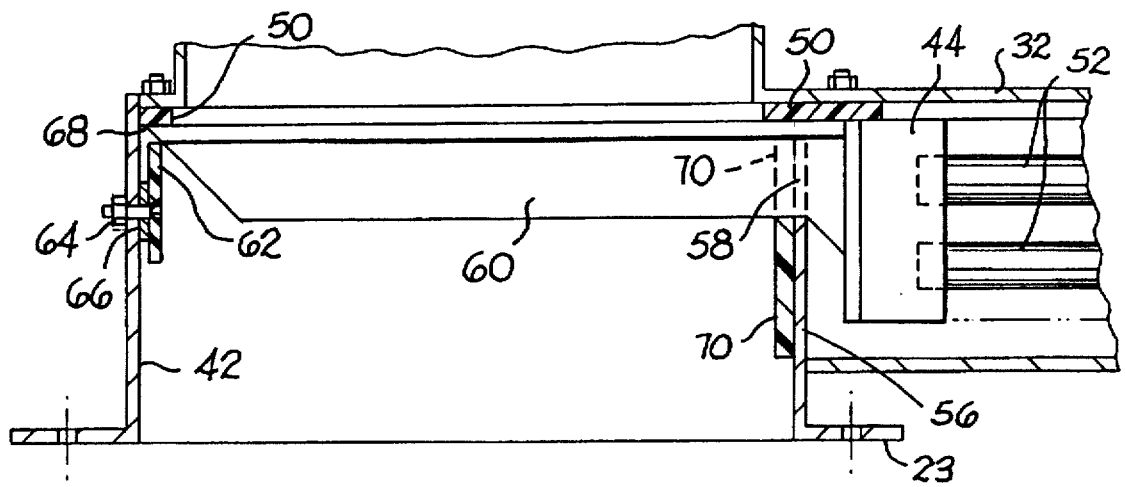
FIG. 4 is a view taken along the section 4—4 of FIG. 2.
Figure 5:
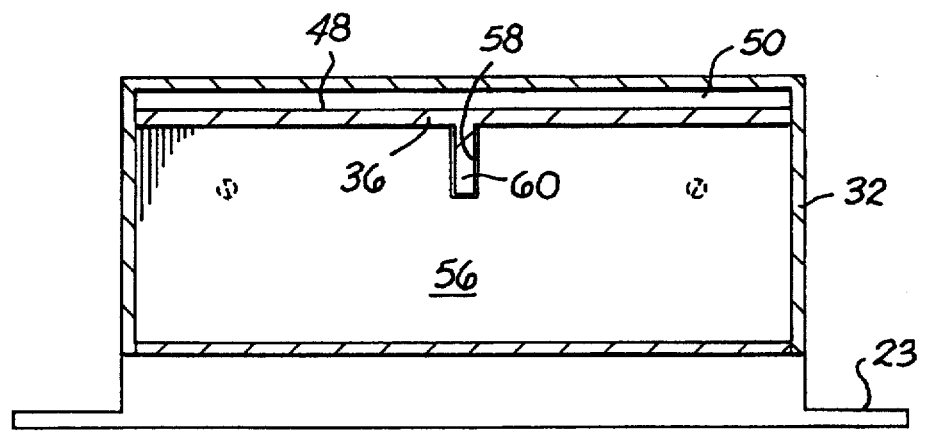
FIG. 5 is a view taken along the section 5—5 of FIG. 3.

FIG. 5 shows the substantially vertical separator wall 56 in the upper housing 32, which is identical to the same wall 56 in the lower housing 34. It also shows the slot 58 in the separator wall 56. FIG. 4 shows that the inside surface of the separator wall 56 is lined with a liner 70, which is preferably made of Teflon®.

Figure 6:
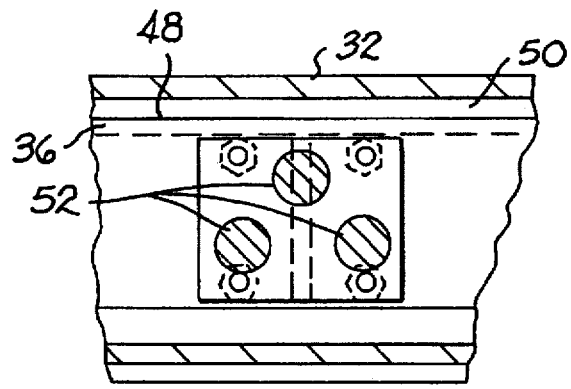
FIG. 6 is a view taken along the section 6—6 of FIG. 3.

FIG. 6 shows the three parallel piston rods 52, which are mounted to the gate 36 (or 38), to move the gate to its open and closed positions.

Figure 7:
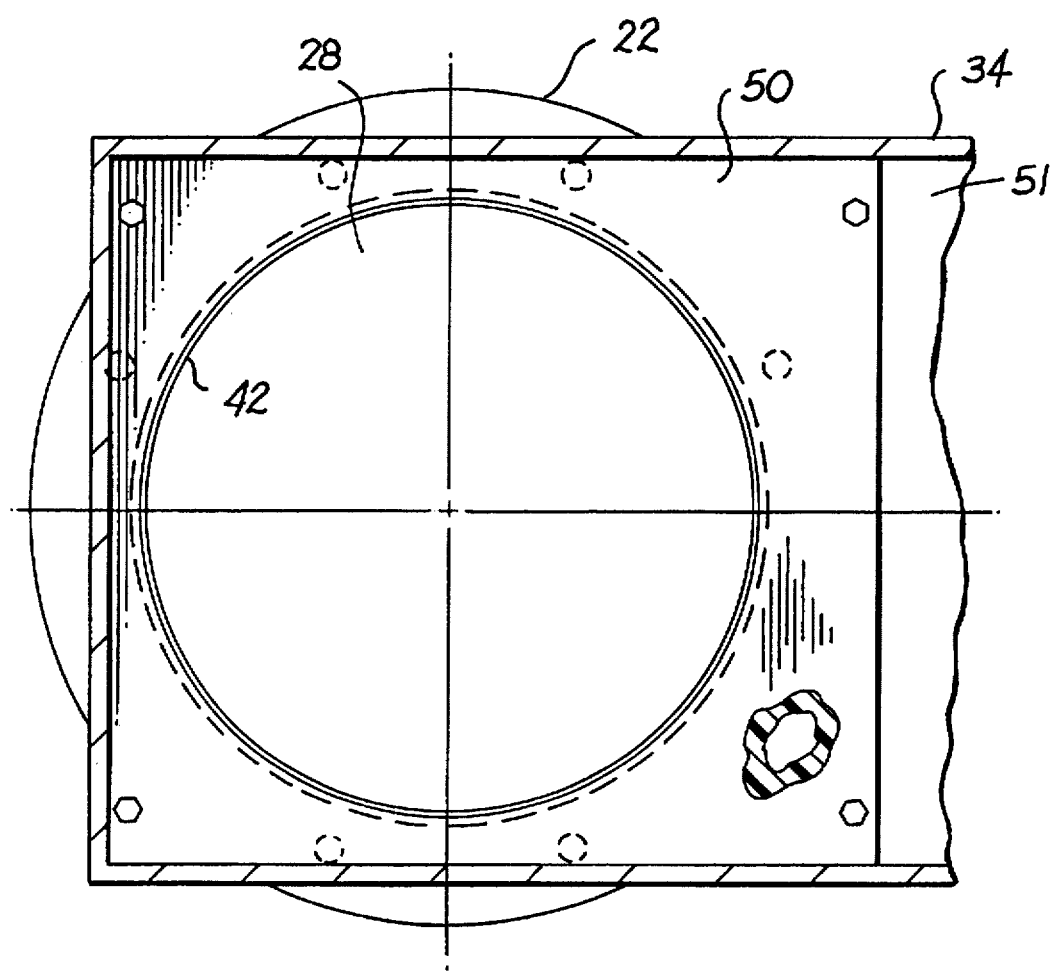
FIG. 7 is a view taken along the section 7—7 of FIG. 3.

FIG. 7 shows the sealing-scraper surface 50 mounted on the inside surface of the top wall of the slide gate housing 32, surrounding the material inlet 28.

Looking again at FIG. 3, it can be seen that the upper and lower slide gate housings 32, 34 each have upper and lower flanges 22, 23, respectively, and a transition piece 72, having upper and lower flanges 74, 76 is bolted to the bottom flange 23 of the upper housing 32 and to the top flange 22 of the lower housing 34, and provides a steep, frustro-conical surface between the larger diameter outlet 78 of the upper slide gate housing 32 and the smaller diameter inlet 28 of the lower slide gate housing 34.

FIGS. 2 and 3 show clean-out doors 80 bolted to the bottom of each of the slide gate housings 32, 34 outside the separator wall 56. The clean-out door 80 can be opened periodically to clean out any small amount of dust that might have been aisle to pass through into that area, and to provide access into that compartment of the housings 32, 34 to tighten bolts or make other adjustments.

It will be obvious to those skilled in the art that the feeder-air lock described above may be used in other situations besides on the bottom of a cyclone and that modifications may be made to the preferred embodiment of the invention described above without departing from the scope of the invention.

What is claimed is:

1. A feeder-air lock, comprising:

a substantially vertical passage defining an inside surface through which material can fall;

first and second slide gate housings mounted at two different vertical positions along said substantially vertical passage, each of said slide gate housings having a top wall, defining a material inlet, said top wall having an inside surface including a sealing-scraper surface surrounding said material inlet; and having a material outlet below its respective material inlet; and including a slide gate between said material inlet and outlet, said slide gate having a free end and a drive end, wherein the drive end is connected to a mechanical drive which moves its respective slide gate to an extended position, in which the slide gate extends across said slide gate housing to close off said passage, and a retracted position, in which said passage is open, providing a completely smooth, downwardly-extending surface for the dust to pass through;

said slide gate having a smooth, flat top surface which seals against said sealing-scraper surface; a bottom surface opposite said top surface; and a supporting rib projecting downwardly from said bottom surface;

said slide gate housing having a substantially vertical separator wall, defining a gap between said sealing-scraper surface of said top wall and said separator wall through which the respective slide gate projects; and defining an upwardly-opening slot in said separator wall which provides a cantilever support to said supporting rib as the slide gate moves from its retracted to its extended position; said separator wall defining an inside surface, facing toward the passage, and an outside surface facing away from the passage, wherein said mechanical drive is located outside of said separator wall.

2. A feeder-air lock as recited in claim 1, wherein the sealing-scraper surface of the top wall of each respective housing is made of a lower friction material than the rest of said housing so as to provide low friction as the slide gate moves in and out.

3. A feeder-air lock as recited in claim 1, wherein the free end of each slide gate projects slightly beyond the end of its respective supporting rib; and further comprising a ledge spaced inwardly from the inside surface of said passage opposite said separator wall, said ledge providing a support for the free end of its respective slide gate when the slide gate is in its extended, closed position.

4. A feeder-air lock as recited in claim 3, wherein the free end of each slide gate is tapered to a knife edge at its top edge so that, as said slide gate closes, it pushes any dust off of said ledge and has very little surface in contact with the inside surface of the passage at its free end.

5. A feeder-air lock as recited in claim 1, wherein said mechanical drive is a piston-cylinder arrangement, with the cylinder fixed relative to the respective housing, and with at least three piston rods projecting from said cylinder and mounted to said respective slide gate.

6. A feeder-air lock as recited in claim 1, in combination with a dust-collecting cyclone, having a cyclone dust outlet, wherein said feeder-air lock is mounted at the cyclone dust outlet.

7. A feeder-air lock, comprising:

a substantially vertical passage through which material can fall;

first and second slide gates mounted at different vertical heights on said substantially vertical passage for opening and closing said passage;

a housing surrounding each of said slide gates, the housing including a substantially vertical wall defining an inside surface facing the passage and an outside surface facing away from the passage;

a cantilever support for said slide gate located outside of said passage; and a drive mechanism for each of said slide gates located outside of said passage, so that said passage provides a completely smooth, downwardly sloping wall for directing said material downwardly when said slide gates are in an open, retracted position.

8. A feeder-air lock as recited in claim 1, wherein said mechanical drive is a piston-cylinder arrangement, with the cylinder fixed relative to the respective housing, and with at least two piston rods projecting from said cylinder and mounted to said respective slide gate.

9. A feeder-air lock as recited in claim 7, wherein each of said slide gate housings includes an interior top surface, and wherein the respective slide gate seals against said interior top surface when it is closed.

10. A feeder-air lock as recited in claim 9, and further comprising a ledge spaced inwardly from the inside surface of said passage opposite said vertical wall, said ledge providing a support for its respective slide gate when the slide gate is in an extended, closed position.

* * * * *